US006605664B2

(12) United States Patent
Kanou et al.

(10) Patent No.: US 6,605,664 B2
(45) Date of Patent: Aug. 12, 2003

(54) PIGMENT DISPERSIONS, AND WRITING INSTRUMENTS AND PRINTERS WITH THE DISPERSIONS STORED THEREIN

(75) Inventors: Kazuo Kanou, Tokyo (JP); Yoshifumi Sugito, Tokyo (JP); Hiroaki Saikatsu, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/502,459

(22) Filed: Feb. 11, 2000

(65) Prior Publication Data

US 2003/0027906 A1 Feb. 6, 2003

(30) Foreign Application Priority Data

Feb. 16, 1999 (JP) ............................................. 11-037839

(51) Int. Cl.[7] ........................ C08L 51/00; C08L 73/00; C08L 33/14; C08L 35/00; C09D 11/10; C09D 11/16
(52) U.S. Cl. ....................... 524/504; 524/549; 524/558; 523/160; 523/161
(58) Field of Search ................................. 523/160, 161; 106/31.6, 31.75; 524/504, 549, 558, 559

(56) References Cited

U.S. PATENT DOCUMENTS

| | | |
|---|---|---|
| 3,262,933 A | 7/1966 | Mix et al. |
| 3,282,940 A | 11/1966 | Weber et al. |
| 3,297,695 A | 1/1967 | Weidinger et al. |
| 3,300,491 A | 1/1967 | Jenny et al. |
| 3,349,089 A | 10/1967 | Kazankov et al. |
| 3,470,178 A | 9/1969 | Neeff et al. |
| 3,488,349 A | 1/1970 | Neeff |
| 3,684,808 A | 8/1972 | Ulrich |
| 4,098,793 A | 7/1978 | Ribaldone et al. |
| 4,303,764 A * | 12/1981 | Becher et al. ............... 524/558 |
| 4,442,287 A | 4/1984 | Hartwig et al. |
| 4,558,095 A * | 12/1985 | Barth et al. .................... 525/57 |
| 5,124,226 A * | 6/1992 | Yabuuchi et al. ........... 430/137 |
| 5,231,131 A * | 7/1993 | Chu et al. .................... 524/504 |
| 5,368,976 A | 11/1994 | Tajima et al. |
| 5,483,004 A * | 1/1996 | Hoffmann et al. ........ 525/326.7 |
| 5,536,776 A * | 7/1996 | Carpenter et al. ........... 524/556 |
| 5,599,859 A * | 2/1997 | Tonogaki et al. .............. 524/95 |
| 5,658,376 A * | 8/1997 | Noguchi et al. .......... 106/31.43 |
| 5,731,110 A | 3/1998 | Hishiro et al. |
| 5,736,606 A * | 4/1998 | Yanagi et al. ................ 524/547 |
| 5,782,967 A * | 7/1998 | Shirota et al. ........... 106/31.58 |
| 5,811,219 A | 9/1998 | No et al. |
| 5,827,626 A | 10/1998 | Kobayashi et al. |
| 5,853,924 A | 12/1998 | Uwami et al. |
| 5,861,447 A * | 1/1999 | Nagasawa et al. ........... 523/161 |
| 5,863,678 A | 1/1999 | Urano et al. |
| 5,891,232 A * | 4/1999 | Moffatt et al. ........... 106/31.89 |
| 5,913,972 A | 6/1999 | Kanou et al. |
| 5,942,560 A * | 8/1999 | Idogawa et al. ............. 523/161 |
| 5,961,711 A | 10/1999 | Saikatsu et al. |
| 6,005,023 A * | 12/1999 | Anton et al. ................. 523/161 |
| 6,150,433 A * | 11/2000 | Tsang et al. ................. 523/160 |
| 6,299,676 B1 * | 10/2001 | Saikatsu et al. .......... 106/31.77 |

FOREIGN PATENT DOCUMENTS

JP 06122846 * 5/1994

OTHER PUBLICATIONS

English Translation of JP 06122846 (1994).*

* cited by examiner

*Primary Examiner*—Callie Shosho
(74) *Attorney, Agent, or Firm*—Oblon, Spivak, McClelland, Maier & Neustadt, P.C.

(57) ABSTRACT

A pigment dispersion is composed of a pigment, a polymer and a solvent. The polymer has, on side chains thereof, carboxyl groups derived from a dibasic acid. The pigment dispersion is useful for writing instruments and printers.

34 Claims, No Drawings

PIGMENT DISPERSIONS, AND WRITING INSTRUMENTS AND PRINTERS WITH THE DISPERSIONS STORED THEREIN

BACKGROUND OF THE INVENTION a) Field of the Invention

This invention relates to pigment dispersions, and also to writing instruments and printers with the dispersions stored therein. More specifically, this invention is concerned with pigment dispersions which are low in viscosity and excellent in flowability and are useful for writing instruments, printers and the like, and also with writing instruments and printers with the dispersions stored therein.

b) Description of the Related Art

A marking ink for use in writing instruments, which make use of bundled fiber tips or felt tips, has conventionally been made of a resin, a colorant and a solvent. A dye is employed as the colorant, while an aromatic solvent is used as the solvent because of its excellent dissolving power for the dye. However, aromatic solvents are especially harmful for our health and moreover, are air pollutants. Investigations have been made on marking inks which do not use aromatic solvent, but no marking inks satisfactory in the density, light fastness and transference resistance of written or drawn characters or marks have been obtained yet.

Ink-jet printing is computer-controlled digital printing. Printing information is directly fed from a computer to an ink-jet printer through a cable to form an image or mark, so that different from general printers, no plate-making is needed. Owing to this, ink-jet printing is suited especially for the printing of displays which are generally needed in a small number of copies. Advancements in ink-jet printers in recent years have made it possible to perform highly-detailed, large-size printing. As inks for such printing, those having low viscosity and excellent stability are needed. Solvent-base ink-jet printing inks making use of dyes are known, but ink-jet printing inks making use of pigments are used as water-base inks because of technical difficulties involved in the production of solvent-base ink-jet printing inks making use of pigments.

With a water-base ink-jet printing ink, however, neither good ink adhesion nor good color development is available, since the content of a resin used as a pigment binder or vehicle in the ink is extremely low. Further, the water-base ink-jet printing ink also involves a problem in its adhesion to plastic films. There is accordingly a strong desire for the development of ink-jet printing inks each of which uses a pigment, does not use an aromatic solvent but more desirably employs an alcoholic solvent, and has good color developing property. According to conventional technology, however, dispersion of a pigment in a solution of a resin relies substantially on the dispersing power of the resin as seen in paints or the like. When the dispersion of the pigment cannot be achieved to sufficient extent by solely relying upon the resin, a pigment dispersant (surfactant or the like) of relatively low molecular weight has also been used in combination to date. When carboxyl groups are introduced into a polymer to provide the polymer with pigment-dispersing power, a carboxyl-containing monomer such as acrylic acid, methacrylic acid or maleic acid has been used as an additional monomer upon polymerization.

Compared with general paints, pigment inks for writing instruments or printers are required to have an extremely low viscosity and also an extremely high level of pigment dispersion. Conventional dispersion methods, which make use of polymeric dispersants, are therefore extremely difficult to obtain pigment inks for writing instruments or printers, said pigment inks being capable of exhibiting required performance, because the dispersion of pigments is not sufficient or due to insufficient compatibility between the pigments and the polymeric dispersants, desorption of the polymeric dispersants from the pigments and/or time-dependent variations in ink viscosity take place.

If ethyl alcohol or another solvent having a high tolerance level to organic solvent intoxication can be used as a solvent in a pigment ink for writing instruments or printers, such a solvent gives much less deleterious effect to the health of a user of a writing instrument or printer and also the health of people in the same room or in the same environment. Further, non-use of aromatic solvents can lessen the problem of air pollution, and moreover, pigment inks making use of such an ink are free of drawbacks of water-base pigment inks, that is, problems of slow drying rate and ink repellency on plastic films.

Furthermore, an alcohol is a resource reproducible from the nature and is preferred as an ink solvent. Nonetheless, conventionally-known alcohol-soluble resins are extremely difficult to obtain pigment inks for writing instruments or printers, said pigment inks having low viscosity, high pigment dispersion and high liquid stability all of which are required for such inks, even if a dispersant is used in combination for the dispersion of the pigments.

SUMMARY OF THE INVENTION

An object of the present invention is therefore to provide a pigment dispersion by using a polymeric dispersant, which is soluble in an alcohol or another solvent having high safety, in a sufficient amount relative to a pigment, said pigment dispersion having a low viscosity and a high dispersion level of the pigment, being suited as a pigment ink for a writing instrument or printer, and giving less deleterious effect to the health of a user of the writing instrument or printer and also the health of people in the same room or in the same environment.

The present inventors have proceeded with extensive research to achieve the above-described object. As a result, it has been found that use of a polymer, which contains particular carboxyl groups as side chains, as pigment dispersant and vehicle makes it possible to achieve the object of the present invention.

In one aspect of the present invention, there is thus provided a pigment dispersion composed of a pigment, a polymer and a solvent, wherein said polymer has, on side chains thereof, carboxyl groups derived from a dibasic acid.

In another aspect of the present invention, there is also provided a writing instrument or printer with the pigment dispersion stored therein.

The pigment dispersion according to the present invention has low viscosity and good stability and is excellent as a pigment dispersion for writing instruments or printers. The dispersion is expected to bring about superb effects when employed in other fields where pigment dispersions having still lower viscosity and excellent flowability are desired, for example, when employed for gravure printing and flexographic printing, surface coloring of color filters and stained glass, coloring of leather, and the like. Owing to the use of the pigment dispersion, the writing instrument or printer according to the present invention gives less deleterious effect to the health of its user and also the health of people in the same room or in the same environment.

DETAILED DESCRIPTION OF THE INVENTION AND PREFERRED EMBODIMENTS

The polymeric dispersant (hereinafter simply called "polymer") for use in the present invention has, on side chains thereof, carboxyl groups derived from a dibasic acid. More desirably, the carboxyl groups are those derived from a dibasic acid of a cyclic compound. Such a polymer can be obtained by one of processes to be described hereinafter. A first process is to mix a monomer containing both an addition-polymerizable group and a carboxyl group, desirably a monomer which contains a residual group of a saturated or unsaturated, carboxyl-containing cyclic compound, said residual group being bonded directly or via a connecting group (see formula 1 below) to a moiety containing an addition-polymerizable group, with another monomer polymerizable with the first-mentioned monomer and then to copolymerize the resulting mixture. A second process is to react an acid anhydride of a dibasic acid, for example, phthalic anhydride or the like with a polymer containing groups reactive with an acid anhydride, such as hydroxyl groups (see formula 2 below). The process of the formula 1 is more preferred. It is to be noted that the following formulas are merely for illustration purpose and are by no means intended to limit the present invention.

First Process

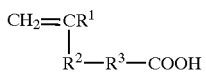

(1)

$R^1$: desired substituent group
$R^2$: connecting group (e.g., —O—CO—)
$R^3$: residual group of cyclic compound Second Process

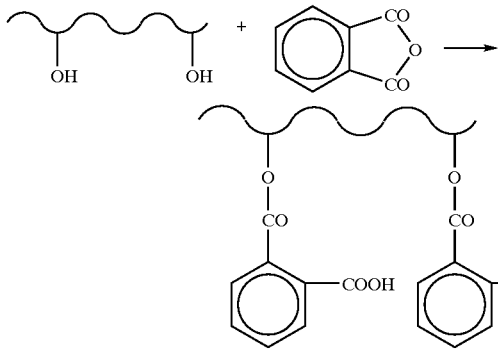

Examples of the monomer (1) used in the process 1 which contains a residual group of a saturated or unsaturated, carboxyl-containing cyclic compound, said residual group being bonded directly or via a connecting group (see formula 1 below) to a moiety containing an addition-polymerizable group, can include (meth) acryloyloxyethyl phthalate, (meth) acryloyloxypropyl phthalate, (meth) acryloyloxybutyl phthalate, (meth) acryloyloxyalkyl hexahydrophthalates, (meth) acryloyloxyalkyl tetrahydrophthalates, (meth)acryloyloxyalkyl 3,6-endoethylene-1,2,3,6-tetrahydrophthalates and mono (meth) acryloyloxyalkyl 2,3-naphthalenedicarboxylates. To synthesize a polymer by using one of these hydroxyl-containing monomers, the carboxyl-containing monomer is mixed with another monomer copolymerizable with the carboxyl-containing monomer and the resulting mixture is copolymerized. The carboxyl-containing monomer may be used in a range of 0.2 wt. % or more, preferably from 1 to 30 wt. % based on the whole amount of the monomers used upon copolymerization.

Examples of another monomer usable in the above-described copolymerization can include: as (meth)acrylate ester monomers, methyl (meth)acrylate, ethyl (meth)acrylate, propyl (meth)acrylate, butyl (meth)acrylate, octyl (meth)acrylate, lauryl (meth)acrylate, stearyl (meth)acrylate, cyclohexyl (meth)acrylate, benzyl (meth)acrylate, isobornyl (meth)acrylate, and tetrafurfuryl (meth)acrylate; as hydroxyl-containing (meth)acrylate ester monomers, hydroxyethyl (meth)acrylate, hydroxypropyl (meth)acrylate, esters of monoesters with diols, said monoesters having been formed between hydroxyalkyl (meth)acrylates and dibasic acids, for example, a monoester between (i) a monoester between succinic acid, phthalic acid or cyclohexanedicarboxylic acid and hydroxyethyl or hydroxypropyl (meth)acrylate and (ii) ethylene glycol or propylene glycol; and as amido-containing (meth)acrylate monomers, (meth)acrylamide, N-substituted (meth)acrylamides, for example, (meth)acrylic butoxymethylamide, N-tert-butylacryl-amide, N-tert-butylmethacrylamide, diacetoneacrylamide, N-isopropylacrylamide, N,N-dimethylacrylamide, N,N-diethylacrylamide, N-methylol (meth)acrylamide, and N-alkyloxyethyl (meth)acrylamide. Other usable examples can include (meth)acrylic monomers such as (meth)acrylonitrile. Further usable examples can include styrene and styrene derivatives, for example, α-methylstyrene; mono- or diesters of dibasic acids, for example, dialkyl maleates, dialkylol fumarates, and dicycloalkyl itaconates; and vinyl acetate.

In the present invention, it is preferred to use, as a solvent in the pigment dispersion, an alcoholic solvent or a mixed solvent containing an alcoholic solvent (hereinafter simply called "alcoholic solvent"). When an alcoholic solvent is used, the polymer obtained by the above-described process must be soluble in he solvent. To obtain such a polymer, the hydroxyl- or amido-containing monomer out of the above-described monomers may be used in a range of 10 wt. % or more, preferably from 20 to 60 wt. % based on the whole amount of the monomers used.

The polymerization process for obtaining the polymer for use in the present invention can be either suspension polymerization or solution polymerization. The polymer may have a number average molecular weight of from 2,000 to 100,000, preferably from 2,000 to 50,000. The acid value may range from 0.5 to 200, with a range of from 2 to 60 being preferred. In the present invention, one or more resins other than the above-described polymer may also be used in combination upon production of the pigment dispersion.

As the pigment for use in the present invention, conventionally known organic pigments and carbon black can be used. Usable examples can include azo pigments, condensed azo pigments, anthraquinone pigments, perylene/perinone pigments, indigo-thioindigo pigments, isoindolinone pigments, azomethine pigments, azomethineazo pigments, quinacridone pigments, aniline black pigments, phthalocyanine blue and green pigments, dioxazine violet, and carbon black.

The pigment for use in the present invention may preferably be cationic at surfaces thereof. No particular limitation is imposed on the origin of this cationic property. For example, the cationic property may be one inherent to the pigment itself, may be one imparted by adsorption or deposition of a cationic pigment-treating agent on the pigment, or may be one imparted to the surfaces of the pigment through a reaction or salt formation with a cationic pigment-treating agent.

Excellent as the pigment-treating agent is a cationic pigment-treating agent which contains, as a moiety having compatibility with the pigment, a structure close to the pigment to which the pigment-treating agent is used. Usable examples can include cationic pigment-treatment agents, each of which is a compound, which contains an anthraquinone ring, and has a cationic group bonded to the compound. As examples meeting these conditions, cationic pigment-treating agents represented by the following formula can be mentioned:

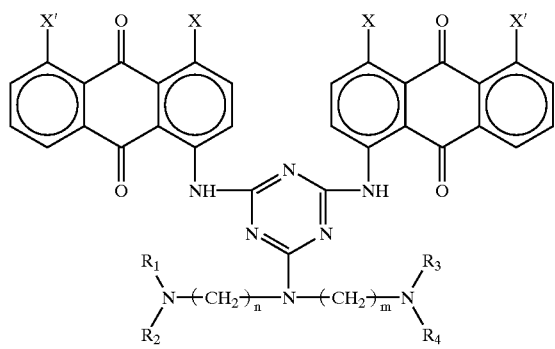

wherein X and X' each independently represent a hydrogen atom or a benzoylamino group, $R_1$ to $R_4$ each independently represent a methyl or ethyl group, and n and m each independently stand for 2 or 3.

Examples of the above-described cationic pigment-treating agents can include 2,4-bis[4-benzoylamino-anthraquinonyl(-1')-amino]-6-bis[(N,N-dimethylamino)-propyl]imino-s-triazine and 2,4-bis[5-benzoylamino-anthraquinonyl(-1')-amino]-6-bis[(N,N-dimethylamino)-propyl]imino-s-triazine. As other treating agents for imparting cationic property to pigments, dialkylamino-alkyl (meth)acrylates, for example, dimethylaminoethyl methacrylate polymer can be used preferably.

Illustrative of the alcoholic solvent for use in the present invention are ethyl alcohol, propyl alcohol, methoxypropanol, ethoxypropanol, and propyloxyethanol. They can be used either singly or in combination. Depending on the application purpose of the pigment dispersion according to the present invention, for example, when high waterproofness, weatherability and the like are required or adhesion to plastic films is required, an ester-type solvent and/or a ketone-type solvent can also be used in combination.

Examples of usable ester-type solvents can include ethyl acetate, propyl acetate, cyclohexyl acetate, ethyl butyrate, and ethyl lactate. Examples of usable ketone-type solvents can include methyl ethyl ketone, methyl propyl ketone, and ethyl butyl ketone. If needed for the prevention of whitening of an image or mark during drying subsequent to writing or recording, isophorone, benzyl alcohol or the like can be added in a small proportion. One or more other solvents may also be used in combination to an extent not contrary to the spirit of the present invention.

Preferred embodiments for obtaining the pigment dispersion of the present invention by using the above-described polymer, pigment, pigment-treating agent and solvent can include the following two methods: (1) after the pigment is treated beforehand with the pigment-treating agent, the treated pigment is dispersed in a solution of the polymer in the solvent; and (2) the untreated pigment and the pigment-treating agent are mixed in the solution of the polymer, and are then dispersed by a dispersion mixer.

Specifically, the dispersing method (1) can be practiced as will be described next.

(a) After the pigment and pigment-treating agent are dissolved in sulfuric acid or the like, the resulting sulfuric acid solution is poured into water to make the treated pigment precipitate. The precipitate is then neutralized, collected by filtration, washed with water, dried and pulverized to obtain the treated pigment (b) The pigment-treatment agent is converted into a salt with sulfuric acid, hydrochloric acid, acetic acid or the like. The salt is mixed with the pigment in water and, if necessary, the resulting mixture is dispersed in a dispersion mixture, such that the pigment-treating agent is adsorbed on surfaces of the pigment. The treated pigment is caused to precipitate with an alkali. The precipitate is then collected by filtration, washed with water, dried and pulverized to obtain the treated pigment.

(c) The pigment-treating agent is dissolved in a liquid organic acid such as acetic acid, into which the pigment is added and, if necessary, the resulting mixture is dispersed in a dispersion mixture, such that the pigment-treating agent is adsorbed on surfaces of the pigment. The treated pigment is poured into water with an alkali contained therein, whereby the treated pigment is caused to precipitate. The precipitate is then collected by filtration, washed with water, dried and pulverized to obtain the treated pigment.

To obtain a pigment dispersion by using the pigment surface-treated and imparted with dispersibility as described above, the pigment can be dispersed further in a solid polymer to obtain pigment chips. The pigment chips can then be dissolved in a solvent and, if necessary, the polymer can be added further, whereby a pigment dispersion can be obtained. These pigment chips can be obtained as will be described next.

(a) The solid polymer, which has been obtained by suspension polymerization or which has been obtained by conducted solution polymerization and then removing a solvent, and the treated pigment are kneaded under heat by using one of a kneader, a Banbury mixer, a mixing roll and a three-roll mill or two or more of them in combination such that the pigment is dispersed in the polymer. The resulting mass is ground or chopped into pigment chips.

(b) In a kneader, a solution of the polymer in an water-soluble solvent and a presscake of the treated pigment are mixed and heated to the softening point of the polymer or higher, whereby water is eliminated. Subsequent to further dispersion of the resulting mass by a three-roll mill or an extruder as needed, the mass is ground or chopped into pigment chips.

(c) A presscake of the pigment and the solid polymer are subjected to flushing at the softening temperature of the polymer or higher.

According to the dispersing method (2), on the other hand, the untreated pigment and the pigment-treating agent are added to a solution of the polymer in the solvent and, if necessary, the resulting mixture is subjected to premixing. The mixture so obtained is then dispersed in a dispersion mixer, whereby it is converted into a pigment dispersion. No particular limitation is imposed of the dispersion mixer usable in the present invention, and a kneader, an attritor, a ball mill, a sand mill or horizontal disperser making use of glass beads, zirconium beads or the like, a colloid mill or the like can be used, for example.

The concentration of the pigment in the pigment dispersion according to the present invention varies depending on the type of the pigment, but may range from 0.5 to 50 wt. %, preferably from 0.5 to 30 wt. % based on the dispersion. The content of the polymer may range from 5 to 600 parts by weight, preferably from 20 to 500 parts by weight per 100 parts by weight of the pigment. The viscosity of the dispersion may range from 1 to 50 mPs/se, preferably from 2 to 30 mPs/sec. Further, the average particle size of the pigment in the dispersion may be 0.5 μm or smaller, preferably 0.2 μm or smaller. It is particularly important that the viscosity of the pigment dispersion has excellent stability with time.

In the present invention, a variety of additives can also be added to the pigment dispersion. Illustrative of usable additives are fastness improvers such as ultraviolet absorbers and antioxidants; anti-settling agents; release agents and releasability improvers; perfumes, antimicrobial agents, and anti-molds; plasticizers; and drying inhibitors. If necessary, one or more dyes can be added further. The thus-obtained pigment dispersion can be used as is. It is however preferable from the standpoint of providing writing instruments or printers with heightened reliability to remove coarse particles, which may exist in a trace amount, by a centrifugal separator, an ultracentrifugal separator or a filter.

To use the thus-obtained pigment dispersion of this invention as an ink for a writing instrument, the pigment dispersion is filled in a casing equipped with a porous tip. Using the writing instrument so obtained, writing is feasible. No particular limitation is imposed on the casing insofar as it has a size and shape convenient for writing. The material of the casing, including its cap, can be a metal, a plastic or a composite material thereof insofar as it is practically free from solvent permeation.

No limitation is imposed on the structure or material of the porous tip insofar as it allows the ink (pigment dispersion) to move from the interior of the casing to the free end of the tip as writing proceeds. Nonetheless, good writing characteristics, durability and solvent resistance are required. Usable examples of fibers of bundled fiber tips and felt tips can include synthetic fibers such as polyester, polypropylene, nylon, polyacrylonitrile and vinylon fibers; cellulose and cellulose-derived regenerated fibers; and natural fibers such as wool, silk and cotton. Usable examples of open-cell foamed plastic products can include rigid or flexible urethane resin foams, foams of acetalized polyvinyl alcohol, and foams of regenerated fibers. Usable examples of ink-occluding members can include bundled fibers, felted fibers, knitted fibers, and open-cell foamed plastic products.

Pigment dispersions according to the present invention are useful not only as inks for writing instruments and inks for printers but also flexographic inks, gravure printing inks, paint coloring materials, leather coloring materials, color filter coloring materials, and surface coloring materials for glass sheets or plastic films.

The present invention will next be described more specifically by Polymerization Examples and Examples, in which the designations of "part" or "parts" and "%" are all by weight.

Further, the pigment-treating agent 1 which was employed as a treatment for cationizing pigment surfaces is 2,4-bis[4-benzoylaminoanthraquinonyl(-1')-amino]-6-bis [(N,N-dimethylamino)propyl]imino-s-triazine (see Formula A below).

The pigment-treating agent 2 is [CuPc-]—(—NH— triazine-(—N[—CH$_2$CH$_2$CH$_2$—N(—CH$_3$)$_2$]$_2$)$_2$)$_4$ (see Formula B below).

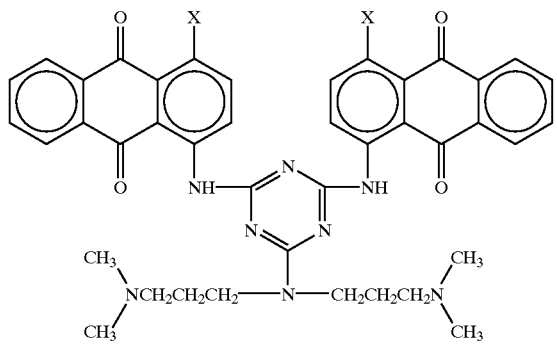

Formula A

[Each X represents a benozylamino group.]

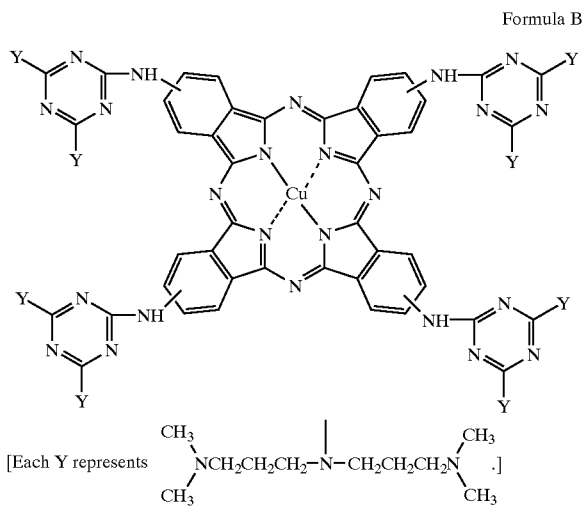

Formula B

[Each Y represents
$$\begin{array}{c} CH_3 \\ \diagdown \\ NCH_2CH_2CH_2-N-CH_2CH_2CH_2N \\ \diagup \\ CH_3 \end{array} \begin{array}{c} CH_3 \\ \diagup \\ \diagdown \\ CH_3 \end{array} \, .]$$

Polymerization Example 1

Using propylene glycol monomethyl ether (1,500 parts) as a polymerization solvent, α-methylstyrene (40 parts), isobornyl acrylate (360 parts), diacetone acrylamide (300 parts), lauryl methacrylate (150 parts), methacryloyloxy-ethyl phthalate (150 parts) and azobisisobutyronitrile (30 parts) were polymerized at 115° C. by the monomer dropping process. The polymer so obtained had a viscosity of 245 mPa/sec at 25° C., a molecular weight of 8,600, and an acid value of 30.2.

Polymerization Examples 2–4

Each of the polymerization mixtures shown below in Table 2 was obtained by conducting polymerization with the corresponding monomer composition in Table 1 under the corresponding polymerization conditions in Table 2 in a similar manner as in Polymerization Example 1. Incidentally, the polymerization mixture (polymerization mixture 1) of Polymerization Example 1 is also presented in Table 1 and Table 2.

TABLE 1

Monomer compositions of polymers, and compositions of polymerization solvents

|  | Composition of polymerization mixture | Polymerization Example (numerical values indicate amounts of used monomers and the like) | | | |
|---|---|---|---|---|---|
|  |  | 1 | 2 | 3 | 4 |
| Monomer composition | α-Methylstyrene | 40 | 40 | — | 40 |
|  | Isobornyl methacrylate | — | 310 | 450 | — |
|  | Isobornyl acrylate | 360 | — | — | 360 |
|  | Hydroxypropyl methacrylate | — | 350 | 200 | 250 |
|  | Diacetone acrylamide | 300 | — | — | — |
|  | Lauryl methacrylate | 150 | 150 | 150 | 150 |
|  | Methacryloyloxyethyl phthalate | 150 | — | — | — |
|  | Acryloyloxyethyl phthalate | — | 150 | — | — |
|  | Methacryloyloxyethyl hexahydrophthalate | — | — | 200 | — |
|  | Methacryloyloxyethyl endomethylene-tetrahydrophthalate | — | — | — | 200 |
| * | Azoisobutyronitrile | 30 | 30 | 30 | 30 |
| Solvent composition | Ethanol | — | — | 500 | — |
|  | Ethyl acetate | — | — | 1000 | — |
|  | Propylene glycol monomethyl ether | 1500 | — | — | — |
|  | Propylene glycol monoethyl ether | — | 1500 | — | 1500 |

* Polymerization initiator

TABLE 2

Polymerization conditions and characteristics of polymers (polymerization mixtures)

|  |  | Polymerization mixture | | | |
|---|---|---|---|---|---|
|  |  | 1 | 2 | 3 | 4 |
| Polymerization conditios | Polymerization temperature (° C.) | 115 | 120 | 78 | 120 |
|  | Polymerizatio process | Dropping | Dropping | Lump-sum | Dropping |
| Characteristics of polymer | Viscosity of polymerization mixture (mPa/sec) | 245 | 260 | 340 | 120 |
|  | Number average molecular weight | 8,600 | 8,300 | 9,500 | 8,800 |
|  | Acid value | 30.2 | 31.8 | 39.4 | 38.1 |

EXAMPLE 1

The polymerization mixture 1 (30 parts), ethyl alcohol (59.58 parts), ethylcyclohexane (4 parts), the pigment-treating agent 1 (0.42 part) and C.I. Pigment Red 17 (6 parts) were dispersed in a horizontal disperser with tumbling medium contained therein until the average particle size of the pigment was reduced to 0.098 $\mu$m or smaller. Coarse particles were removed by a centrifugal separator, whereby pigment ink (pigment dispersion) 1 was obtained. The viscosity of the ink was 3.98 mPa/sec. After the ink was stored at 50° C. for 1 month, its viscosity was measured. The viscosity was found to be 4.06 mPa/sec. The ink was filled in a felt pen casing, and with the felt pen so obtained, writing was performed on a polyethylene film. Good writing was feasible. Further, ethyl alcohol (10 parts) and propylene glycol monomethyl ether (10 parts) were added to the pigment ink 1 (30 parts), followed by stirring. Using the ink (pigment dispersion) so prepared, printing was performed on a polyethylene film by an ink-jet printer. Good ink-jet printing was feasible.

EXAMPLE 2

The polymerization mixture 2 (35 parts), ethyl alcohol (58.58 parts), the pigment-treating agent 1 (0.42 part) and C.I. Pigment Black 7 (6 parts) were dispersed in a horizontal disperser with tumbling medium contained therein until the average particle size of the pigment was reduced to 0.095 $\mu$m or smaller. Coarse particles were removed by a centrifugal separator, whereby pigment ink (pigment dispersion) 2 was obtained. The viscosity of the ink was 4.06 mPa/sec. After the ink was stored at 50° C. for 1 month, its viscosity was measured. The viscosity was found to be 4.18 mPa/sec. The pigment ink 2 was filled in a felt pen casing, and with the felt pen so obtained, writing was performed on a surface-treated polypropylene film. Good writing was feasible. Further, ethyl alcohol (10 parts) and propylene glycol monoethyl ether (10 parts) were added to the pigment ink 2 (30 parts), followed by stirring. Using the ink (pigment dispersion) so prepared, printing was performed on a surface-treated polyethylene film by an ink-jet printer. Good ink-jet printing was feasible. The adhesion of the pigment was good.

EXAMPLE 3

Crude copper phthalocyanine blue (10 parts) and the pigment-treating agent 2 (0.5 part) were dissolved in 98% sulfuric acid (100 parts). Under stirring, the resulting solution was poured into water (10,000 parts). The mixture so obtained was neutralized with caustic soda, followed by filtration at 70° C. The resulting presscake was washed with warm water of 70° C. and was then dried, whereby a treated pigment was obtained. The polymerization mixture 1 (30 parts), ethyl alcohol (64 parts) and the treated pigment (6 parts) were dispersed in a horizontal disperser with tumbling medium contained therein until the average particle size of the pigment was reduced to 0.092 $\mu$m or smaller. Coarse particles were removed by a centrifugal separator, whereby pigment ink (pigment dispersion) 3 was obtained. The viscosity of the ink was 4.12 mPa/sec. After the ink was stored at 50° C. for 1 month, its viscosity was measured. The viscosity was found to be 4.19 mPa/sec. The pigment ink 3 was filled in a felt pen casing, and with the felt pen so obtained, writing was performed on a polyester film. Good writing was feasible. Further, ethyl alcohol (10 parts) and propylene glycol monomethyl ether (10 parts) were added to the pigment ink 3 (30 parts), followed by stirring. Using the ink (pigment dispersion) so prepared, printing was performed on a polyester film by an ink-jet printer. Good ink-jet printing was feasible.

EXAMPLE 4

The polymerization mixture 2 (35 parts), ethyl acetate (40 parts), butyl acetate (15.6 parts), the pigment-treating agent 1 (0.4 part) and C.I. Pigment Red 177 (6 parts) were dispersed in a horizontal disperser with tumbling medium contained therein until the average particle size of the pigment was reduced to 0.105 μm or smaller. Coarse particles were removed by a centrifugal separator, whereby pigment ink (pigment dispersion) 4 was obtained. The viscosity of the ink was 4.07 mPa/sec. After the pigment ink 4 was stored at 50° C. for 1 month, its viscosity was measured. The viscosity was found to be 4.19 mPa/sec. The pigment ink 4 was filled in a felt pen casing, and with the felt pen so obtained, writing was performed on a polyester film. Good writing was feasible. Further, ethyl acetate (10 parts) and butyl acetate (10 parts) were added to the pigment ink 4 (30 parts), followed by stirring. Using the ink (pigment dispersion) so prepared, printing was performed on a polyester film by an ink-jet printer. Good ink-jet printing was feasible.

EXAMPLE 5

An aqueous presscake (21.2 parts, 6 parts in terms of pigment) of C.I. Pigment Red 48:3, the polymerization mixture 4 (10 parts), the pigment-treating agent 1 (0.2 part) and the pigment-treating agent 3 (0.2 part) were charged in a kneader and then kneaded while heating them at 80° C. Separated water was removed. When they were brought into an intimate mass, it was kneaded three times by a three-roll mill, the temperature of which was controlled at 130° C., while causing the solvent and remaining water to evaporate. The thus-kneaded mass (10 parts) was added to the polymerization mixture 4 (25 parts), ethyl alcohol (40 parts) and ethyl acetate (35 parts), followed by stirring and dissolution. Coarse particles were removed by a centrifugal separator, whereby pigment ink (pigment dispersion) 5 was obtained. The viscosity of the ink was 4.18 mPa/sec. After the pigment ink 5 was stored at 50° C. for 1 month, its viscosity was measured. The viscosity was found to be 4.22 mPa/sec. The pigment ink 5 was filled in a felt pen casing, and with the felt pen so obtained, writing was performed. Good writing was feasible. Further, ethyl alcohol (10 parts) and propylene glycol monomethyl ether (10 parts) were added to the pigment ink 5 (30 parts), followed by stirring. Using the ink (pigment dispersion) so prepared, printing was performed by an ink-jet printer. Good ink-jet printing was feasible.

Comparative Example 1

Using propylene glycol monomethyl ether (1,500 parts) as a polymerization solvent, α-methylstyrene (40 parts), isobornyl acrylate (400 parts), diacetone acrylamide (360 parts), lauryl methacrylate (150 parts), acrylic acid (50 parts) and azobisisobutyronitrile (30 parts) were polymerized at 115° C. by the monomer dropping process. The polymer so obtained had a viscosity of 310 mPa/sec at 25° C., a molecular weight of 10,200, and an acid value of 35.4. The pigment-treating agent 1 (0.42 part) was added to a mixture of the polymerization mixture (30 parts), ethyl alcohol (59.58 parts) and ethylcyclohexane (4 parts), followed by stirring. The polymer was gelled, thereby failing to prepare a pigment ink (pigment dispersion).

Comparative Example 2

Using propylene glycol monomethyl ether (1,500 parts) as a polymerization solvent, α-methylstyrene (40 parts), isobornyl acrylate (400 parts), diacetone acrylamide (360 parts), lauryl methacrylate (150 parts), methacrylic acid (50 parts) and azobis-isobutyronitrile (30 parts) were polymerized at 115° C. by the monomer dropping process. The polymer so obtained had a viscosity of 305 mPa/sec at 25° C., a molecular weight of 9,950, and an acid value of 32.6. The pigment-treating agent 1 (0.42 part) was added to a mixture of the polymerization mixture (30 parts), ethyl alcohol (59.58 parts) and ethylcyclohexane (4 parts), followed by stirring. The polymer was gelled, thereby failing to prepare a pigment ink (pigment dispersion).

What is claimed is:

1. An alcoholic-based or a mixed alcohol and at least one of an ester and a ketone-based pigment dispersion, comprising a pigment, a polymer and a solvent, wherein said polymer has, on side chains thereof, carboxyl groups from a dibasic acid;

wherein said polymer is a polymer of an addition-polymerizable monomer which is a reaction product between a dibasic acid anhydride of a cyclic compound and a hydroxyl-containing addition-polymerizable monomer;

wherein said monomer is at least one monomer selected from the group consisting of (meth)acryloyloxyethyl phthalate, (meth)acryloyloxypropyl phthalate, (meth)acryloyloxybutyl phthalate, (meth)acryloyloxyalkyl hexahydrophthalates, (meth)acryloyloxyalkyl tetrahydrophthalates, (meth)acryloyloxyalkyl 3,6-endomethylene-1,2,3,6-tetrahydrophthalates, and mono(meth)acryloyloxyalkyl 2,3-naphthalene dicarboxylates; and wherein said pigment has been subjected to cationization treatment by adsorption or deposition of an amino-containing compound or by salt formation by reaction with the amino-containing compound.

2. The pigment dispersion of claim 1, wherein said pigment is contained in an amount of from 0.5 to 50 parts by weight per 100 parts by weight of said dispersion, and said polymer is contained in an amount of from 5 to 600 parts by weight per 100 parts by weight of said pigment.

3. The pigment dispersion of claim 1, wherein said polymer has an acid value of from 0.5 to 200.

4. The pigment dispersion of claim 3, wherein said polymer has an acid value of from 2 to 60.

5. The pigment dispersion of claim 1, wherein said polymer has a number average molecular weight of from 2,000 to 100,000.

6. The pigment dispersion of claim 5, wherein said polymer has a number average molecular weight of from 2,000 to 50,000.

7. The pigment dispersion of claim 1, wherein said dibasic acid is a dibasic acid of a saturated or unsaturated cyclic compound.

8. The pigment dispersion of claim 1, wherein said carboxyl groups are formed from a reaction between a dibasic acid anhydride of a cyclic compound and hydroxyl groups of a polymer.

9. The pigment dispersion of claim 1, wherein at least 50 wt % of the solvent comprises a solvent having an alcoholic hydroxyl group.

10. The pigment dispersion of claim 9, wherein said solvent is selected from the group consisting of ethyl alcohol, propyl alcohol, methoxypropanol, ethoxypropanol, and propyloxyethanol.

11. The pigment dispersion of claim 1, wherein said pigment is an organic pigment or carbon black.

12. The pigment dispersion of claim 1, wherein said amino-containing compound is a di- or polyamine.

13. The pigment dispersion of claim 1, which is a writing instrument ink.

14. The writing instrument ink of claim 13, wherein said pigment has an average particle size not greater than 0.2 ptm, and having an acid value of from 2 to 60, the solvent being an alcoholic solvent, and the ink having a viscosity of from ito 50 mPa/sec.

15. The pigment dispersion of claim 1, which dispersion has a viscosity of from 1 to 50 mPa/sec.

16. The pigment dispersion of claim 15, which dispersion has a viscosity of from 2 to 30 mPa/sec.

17. The pigment dispersion of claim 1, wherein said pigment has an average particle size of 0.5 μm or smaller.

18. The pigment dispersion of claim 17, wherein said pigment has an average particle size of 0.2 μm or smaller.

19. The pigment dispersion of claim 1, wherein the cationization-treatment comprises treatment with dialkylaminoalkyl(meth)acrylate polymer.

20. The pigment dispersion of claim 19, wherein the dialkylaminoalkyl(meth)acrylate polymer is dimethylaminoethyl methacrylate polymer.

21. The pigment dispersion of claim 1, wherein said amino-containing compound for the cationization treatment has the formula:

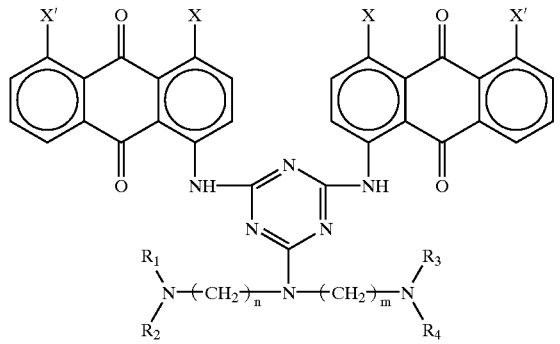

wherein:
X and X' each independently represents hydrogen or benzoylamino;
$R_1$ to $R_4$ each independently represents methyl or ethyl; and
m and n each independently represents 2 or 3.

22. The pigment dispersion of claim 21, wherein said amino-containing compound is selected from the group consisting of 2,4-bis(4-benzoylaminoanthraquinonyl(-1')-amino)-6-bis(N,N-dimethylamino)propyl)imino-5-triazine, and 2,4-bis(5-benzoylamino-anthraquinonyl(-1')-amino)-6-bis((N,N-dimethylamino)propyl)imino-5-triazine.

23. The pigment dispersion of claim 1, which is a printer ink.

24. The printer ink of claim 23, wherein said pigment has an average particle size not greater than 0.2 μm, and having an acid value of from 2 to 60, the solvent being an alcoholic solvent, and the ink having a viscosity of from 1 to 50 mPa/sec.

25. The pigment dispersion of claim 1, which is a flexographic ink, a gravure printing ink, a paint coloring material, a leather coloring material, a color filter coloring material, or a surface coloring material for glass sheets of plastic films.

26. A writing instrument or printer having the pigment dispersion of claim 1, stored therein.

27. A method of effecting writing or printing, which comprises writing or printing with the pigment of claim 1.

28. The method of claim 27, which effects writing by a writing instrument.

29. The method of claim 27, which effects printing by a printer.

30. The method of claim 29, wherein said printer is an ink jet printer.

31. The pigment dispersion of claim 1, wherein the solvent is an alcohol.

32. The pigment dispersion of claim 1, wherein the solvent is a mixture of an alcohol and at least one of an ester and a ketone.

33. An alcoholic-based or a mixed alcohol and at least one of an ester and a ketone-based pigment dispersion, comprising a pigment, a polymer and a solvent, wherein the solvent is an alcohol or a mixture of an alcohol and at least one of an ester and a ketone;
wherein said polymer has, on side chains thereof, carboxyl groups from a dibasic acid;
wherein said polymer is a polymer of an addition-polymerizable monomer which is a reaction product between a dibasic acid anhydride of a cyclic compound and a hydroxyl-containing addition-polymerizable monomer;
wherein said monomer is at least one monomer selected from the group consisting of (meth)acryloyloxyethyl phthalate, (meth)acryloyloxypropyl phthalate, (meth)acryloyloxybutyl phthalate, (meth)acryloyloxyalkyl hexahydrophthalates, (meth)acryloyloxyalkyl tetrahydrophthalates, (meth)acryloyloxyalkyl 3,6-endomethylene-1,2,3,6-tetrahydrophthalates, and mono(meth)acryloyloxyalkyl 2,3-naphthalene dicarboxylates; and
wherein said pigment has been subjected to cationization treatment by adsorption or deposition of an amino-containing compound or by salt formation by reaction with the amino-containing compound.

34. An alcoholic-based or a mixed alcohol and at least one of an ester and a ketone-based pigment dispersion, consisting essentially of a pigment, a polymer and a solvent, wherein the solvent is an alcohol or a mixture of an alcohol and at least one of an ester and a ketone;
wherein said polymer has, on side chains thereof, carboxyl groups from a dibasic acid;
wherein said polymer is a polymer of an addition-polymerizable monomer which is a reaction product between a dibasic acid anhydride of a cyclic compound and a hydroxyl-containing addition-polymerizable monomer;
wherein said monomer is at least one monomer selected from the group consisting of (meth)acryloyloxyethyl phthalate, (meth)acryloyloxypropyl phthalate, (meth)acryloyloxybutyl phthalate, (meth)acryloyloxyalkyl hexahydrophthalates, (meth)acryloyloxyalkyl tetrahydrophthalates, (meth)acryloyloxyalkyl 3,6-endomethylene-1,2,3,6-tetrahydrophthalates, and mono(meth)acryloyloxyalkyl 2,3-naphthalene dicarboxylates; and
wherein said pigment has been subjected to cationization treatment by adsorption or deposition of an amino-containing compound or by salt formation by reaction with the amino-containing compound.

* * * * *